(12) United States Patent
Cassiers et al.

(10) Patent No.: US 9,374,132 B2
(45) Date of Patent: Jun. 21, 2016

(54) COMMUNICATION SYSTEM CAPABLE OF MEASURING CROSSTALK IN LEGACY LINE

(71) Applicant: Broadcom Corporation, Irvine, CA (US)

(72) Inventors: Raphael Paul Cassiers, Waterloo (BE); Miguel Peeters, Woluwe-Saint-Pierre (BE)

( * ) Notice: Subject to any disclaimer, the term of this patent is extended or adjusted under 35 U.S.C. 154(b) by 0 days.

(21) Appl. No.: 13/730,316

(22) Filed: Dec. 28, 2012

(65) Prior Publication Data

US 2014/0185659 A1 Jul. 3, 2014

(51) Int. Cl.
| | |
|---|---|
| H04B 1/38 | (2015.01) |
| H04B 3/32 | (2006.01) |
| H04B 3/487 | (2015.01) |
| H04M 3/30 | (2006.01) |
| H04M 3/34 | (2006.01) |
| H04L 25/08 | (2006.01) |
| H04M 3/18 | (2006.01) |

(52) U.S. Cl.
CPC ........ *H04B 3/32* (2013.01); *H04B 3/487* (2015.01); *H04L 25/085* (2013.01); *H04M 3/18* (2013.01); *H04M 3/304* (2013.01); *H04M 3/34* (2013.01)

(58) Field of Classification Search
CPC ........... H04B 3/32; H04B 3/487; H04M 3/34; H04M 3/18; H04M 3/304; H04L 25/085
USPC .................. 375/222, 227; 370/201; 455/63.1
See application file for complete search history.

(56) References Cited

U.S. PATENT DOCUMENTS

| | | | | |
|---|---|---|---|---|
| 7,801,017 | B2 * | 9/2010 | Nuzman | 370/201 |
| 2009/0175156 | A1 * | 7/2009 | Xu | 370/201 |
| 2009/0310502 | A1 * | 12/2009 | Nuzman et al. | 370/252 |
| 2010/0046684 | A1 * | 2/2010 | De Lind Van Wijngaarden et al. | 375/363 |
| 2012/0082258 | A1 * | 4/2012 | Nuzman et al. | 375/285 |
| 2013/0229905 | A1 * | 9/2013 | Schenk et al. | 370/201 |

OTHER PUBLICATIONS

ITU-T G.993.5 Telecommunication Standardization Sector of ITU, Apr. 2010.*

* cited by examiner

*Primary Examiner* — Leila Malek
(74) *Attorney, Agent, or Firm* — Sterne, Kessler, Goldstein & Fox PLLC

(57) ABSTRACT

A DSL transmitter and receiver are disclosed that are capable of accurately measuring crosstalk in G.vector-compliant DSL lines resulting from a legacy line. During crosstalk measurement, the legacy line can be placed in a showtime mode. Once in showtime mode, a data signal designated for the legacy line is reduced in power spectrum density and/or spectrum to reduce its effects on crosstalk measurements. An O-P-Vector-1 signal is then superposed on the reduced data signal, and the resulting test signal is transmitted over the legacy line while sync signals are transmitted over neighboring G.vector lines. The receiver can then accurately measure the crosstalk on the neighboring lines, and report back to the transceiver for adjustments. A similar configuration can be performed in a diagnostic mode of the legacy line.

14 Claims, 8 Drawing Sheets

COMMUNICATION SYSTEM CAPABLE OF MEASURING CROSSTALK IN LEGACY LINE

BACKGROUND

1. Technical Field

The disclosure relates to an electronics device, and more specifically relates to a transmitter and receiver in a DSL communication system capable of measuring crosstalk in a legacy communication line.

2. Related Art

In DSL (Digital Subscriber Line) communications, a transmitter and receiver communicate with one another over a plurality of "lines." Each line includes a twisted pair of wires for communicating information. Each of the lines is typically loaded with different information so as to allow for parallel communication, and increased throughput.

Because the lines are loaded differently, the lines will interfere with one another in the form of crosstalk. The crosstalk may be generated by undesired capacitive, inductive, or conductive coupling between the lines, and will cause an undesired effect on the information being transmitted in those lines.

For example, data communicated in DSL is often transmitted as a QAM (Quadrature Amplitude Modulation) signal in which binary data is represented by an amplitude and phase corresponding to a particular location on a quadrature constellation. While being transmitted through particular line, the crosstalk generated in the line from the other lines may cause a shift in the amplitude and/or phase of the signal, thereby causing a receiver of the data to misread the binary data contained within the signal as corresponding to a different location of the quadrature constellation. In other words, crosstalk can cause bit errors in transmitted data or limit distance between two points of a constellation and therefore limit achievable signal-to-noise ratio (SNR).

The recent G.993.5 (G.vector) DSL standard includes a built-in crosstalk measurement procedure. However, legacy lines (e.g., lines following earlier DSL standards) lack this capability. Therefore, it is difficult to employ the G.vector crosstalk measurement procedure in the legacy line. One conventional method for measuring the crosstalk in the legacy line involved transmitting the OPV1 signal on the legacy line prior to a handshake procedure. However, when performed in this manner, prior to the handshake, the impedance seen by the legacy line may be different than that seen during showtime (e.g., data transmission) mode, which may lead to an incorrect calculation of crosstalk.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
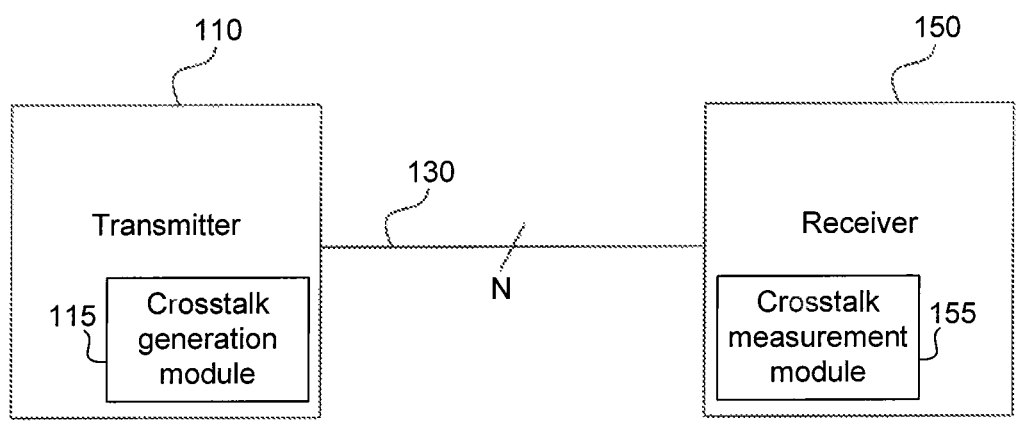
FIG. 1 illustrates a block diagram of an exemplary DSL communication environment.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the disclosure is defined only in accordance with the following claims and their equivalents.

Embodiments of the disclosure may be implemented in hardware (e.g., circuits), firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although several portions of the description of the present disclosure may be described in terms of a DSL system, those skilled in the relevant art(s) will recognize that the present disclosure may be applicable to several other non-DSL communication systems without departing from the spirit and scope of the present disclosure.

An Exemplary DSL Communication Environment

FIG. 1 illustrates a block diagram of an exemplary DSL communication environment 100. The DSL communication environment 100 includes a transmitter 110 and a receiver 150 that communicate with each other via a cable 130, which includes N lines of twisted wire pairs. In an embodiment, the receiver 150 includes several receivers that may or may not be located at a same location.

When seeking to measure the crosstalk between the G.vector lines of the cable 130, a crosstalk module 115 loads a predetermined O-P-VECTOR-1 (OPV1) signal along a test line while simultaneously loading sync symbols (predetermined waveforms without any data) on neighboring lines that are already active. A crosstalk measurement module 155 in the receiver 150 detects the distortion in the sync symbols of each of the neighboring lines to determine the crosstalk effects generated by the test line. The receiver 150 then transmits the crosstalk information back to the transmitter 110 for crosstalk adjusting of future outgoing signals. Herein, G.vector lines are compliant with the G.993.5 (G.vector) DSL standard, and legacy lines are not.

When a legacy line is added to the system 100, the system must determine its crosstalk effects on the other lines. However, because the legacy line is not compliant with the G.vector standard, the above crosstalk measurement procedure must be modified for the legacy line, which is largely handled by the crosstalk module 115.

Exemplary DSL Transmitter

Figure 2:
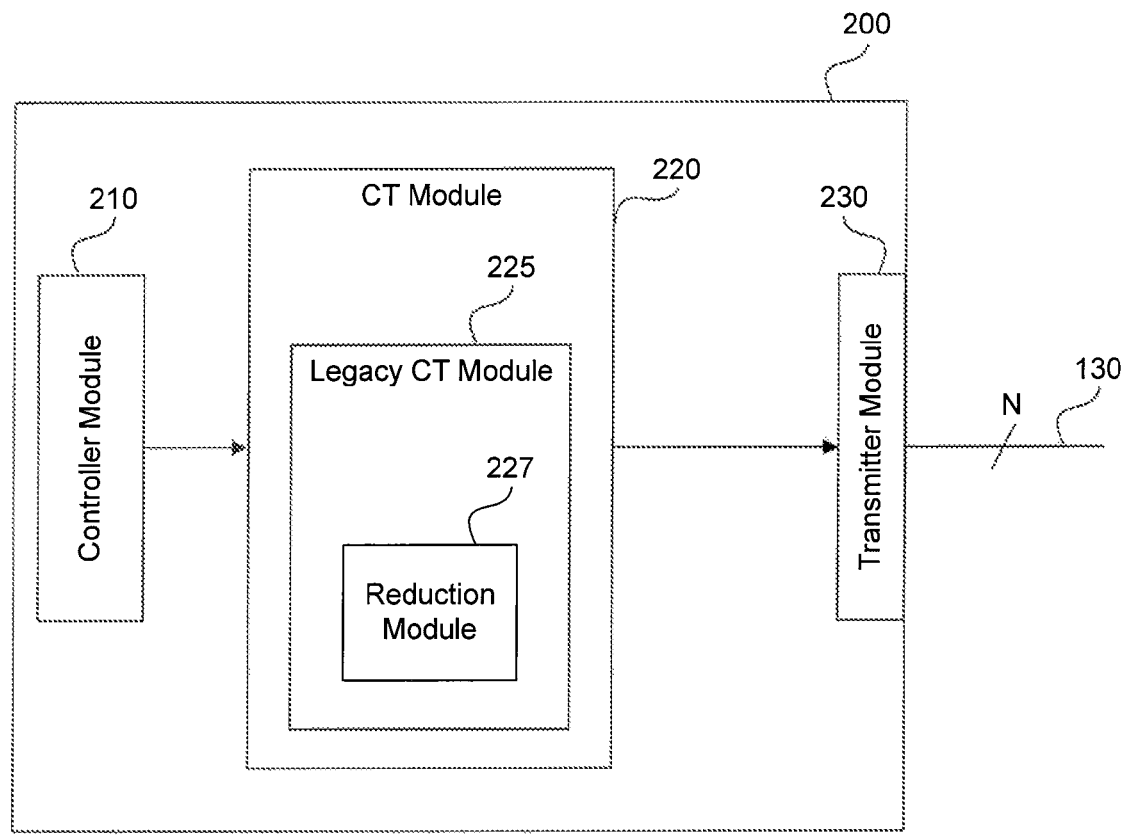
FIG. 2 illustrates a block diagram of an exemplary DSL transmitter.

FIG. 2 illustrates a block diagram of an exemplary DSL transmitter 200 that may be included within the DSL environment 100. The transmitter 200 includes a controller module 210, a crosstalk module 220 and a transmitter module 230, and may represent an exemplary embodiment of the transmitter 110.

The controller module 210 sends data to, and receives data from, the transmitter module 230, which acts as an interface for coupling the transmitter 200 with the DSL cable 130. When a new line is added, the crosstalk module 220 interjects and coordinates crosstalk testing signals on the N lines of the DSL cable 130. For example, when a G.vector compliant line is added, the crosstalk module 220 will, at periodic intervals, interject the OPV1 signal onto the added line and sync signals onto the neighboring lines. It will be understood that the neighboring lines may include any number of adjacent and/or nearby lines relative to the added line.

Once a crosstalk measurement has been achieved using the any of the embodiments disclosed herein, the legacy line can be retrained without PSD or spectrum reduction, to benefit from optimal performance, without disturbing the other lines. This can be achieved using a pre-coding scheme based on the determined crosstalk channel characteristics.

Measure During Showtime Mode

In an embodiment, the transmitter 200 measures the crosstalk of the legacy line during a showtime mode of the legacy line. In this configuration, the controller module 210 will initiate and complete all necessary setup phases in order to place the new line into showtime mode. Such setup phases may include a handshake phase, a channel discovery phase and a transceiver training phase, among others.

Once in showtime mode, the crosstalk module 220 controls the transmissions over the various lines in order to measure the crosstalk resulting from the new legacy line. During data transmission, the crosstalk module 220 acts as a passthrough for data signals, effectively allowing data signals to pass freely between the controller module 210 and the transmitter module 230, but at reduced power spectrum. Specifically, transmitting the data signal at full power spectrum density (PSD) and spectrum bandwidth (e.g., up to 17 MHz) will cause significant undesired crosstalk in the neighboring lines.

For these reasons, the legacy crosstalk module 225 includes a reduction module 227. The reduction module 227 reduces the PSD and/or spectrum of the data signal for the legacy line, hi an embodiment, the PSD of the data signal is reduced to 20 dB below the nominal PSD and the spectrum is reduced to less than 2.2 MHz. Other reductions could be used. In an embodiment, the reduction module 227 does not reduce the PSD of the data signal, but rather the crosstalk module 220 configures a Virtual Noise Level on the G.vector lines to make them robust against the presence of Far-End Crosstalk (HAT) in the reduced frequency band.

When the crosstalk in the added legacy line is to be measured, the crosstalk module 220 modifies communication from the controller module 210 to the transmitter module 230, and interjects the crosstalk test signals into the various lines that are described below in relation to FIG. 3. The crosstalk module 220 can determine the time for performing the crosstalk test based on an instruction received by the controller module 210, by monitoring initiation of the showtime mode in the added legacy line, and/or by monitoring the signals communicated between the controller module 210 and the transmitter module 230, among other ways that are within the spirit and scope of the present disclosure.

As discussed above, the legacy line is not compliant with the G.vector standard, and therefore does not have a protocol for temporarily halting data transmission for testing crosstalk. As a result, the bits of the data signal that were originally intended for the legacy line may still be transmitted while the legacy line is in showtime. However, transmitting the data signal at full power spectrum density (PSD) and spectrum bandwidth (e.g., up to 17 MHz) will cause significant undesired crosstalk in the neighboring lines. As further explanation, the OPV1 signal used in the G.vector standard crosstalk detection is a known signal. Therefore, the crosstalk caused by the tested G.vector line can be easily determined.

However, the data signal in a legacy line is not known by the receiver, making crosstalk detection by the receiver difficult.

For these reasons, the crosstalk module 220 includes a legacy crosstalk module 225 for preparing crosstalk signals for the legacy line. The legacy crosstalk module 225 includes a reduction module 227. The reduction module 227 reduces the PSD and/or spectrum of the data signal for the legacy line. In an embodiment, the PSD of the data signal is reduced to 20 dB below the nominal PSD and the spectrum is reduced to less than 2.2 MHz. In an embodiment, the reduction module 227 does not reduce the PSD of the data signal, but rather the crosstalk module 220 configures a Virtual Noise Level on the G.vector lines to make them robust against the presence of Far-End Crosstalk (FEXT) in the reduced frequency band. During test periods, the legacy crosstalk module 225 superposes the OPV1 signal on the reduced data signal to produce the legacy test signal, and injects the resulting legacy test signal onto the legacy line.

Figure 4A:
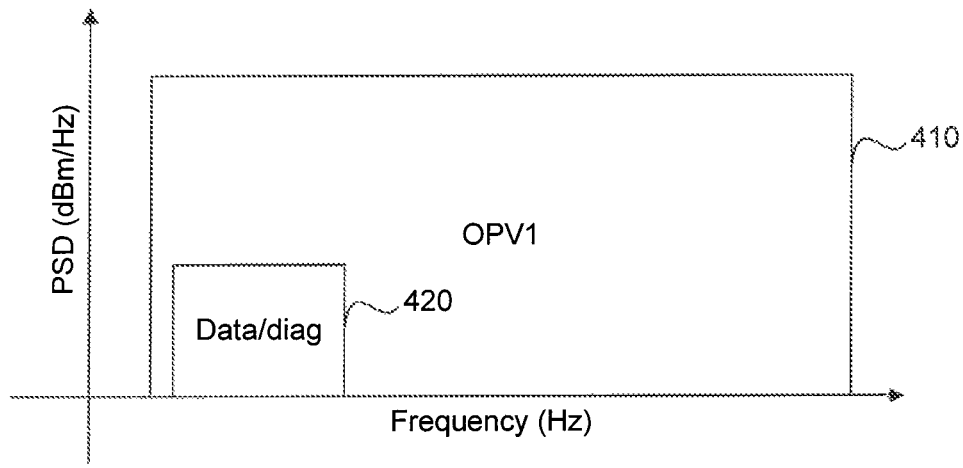
FIG. 4A-4C illustrate graphical representations of an exemplary legacy line spectrum during crosstalk measurement of the legacy line.

FIG. 4A illustrates a graphical representation of an exemplary legacy line spectrum 400 during crosstalk measurement. As shown in FIG. 4A, the data signal 420 is reduced by the reduction module 227 and occupies only a small portion of the available PSD and spectrum of the legacy line in order to reduce noise incident on neighboring lines for crosstalk measurement. This allows the OPV1 signal 410 of the resulting test signal generated by the legacy crosstalk module 225 to occupy a substantial portion of the available PSD and spectrum of the legacy line. As a result, the crosstalk seen by neighboring lines will be primarily from the known OPV1 signal, and only a small amount of the crosstalk will result from the unknown data signal. This allows the receiver 150 to make an accurate measurement of the crosstalk effects of the legacy line.

In an embodiment, rather than transmitting the bits of the data signal that were originally intended for the legacy line, they can be dropped during transmission of the crosstalk test signals while the legacy line is in showtime. This will cause bit errors in the received signal, which can be corrected for at the DSL receiver. In some instances, there may be no data bits corresponding to the time at which the crosstalk test signal is to be transmitted. In this case, no data is lost, and no correction is needed at the receiver.

Figure 4B:
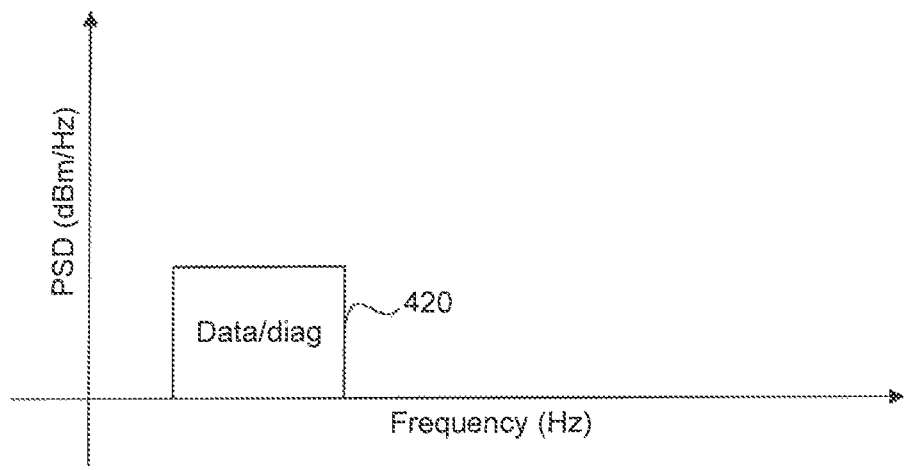
Figure 4C:
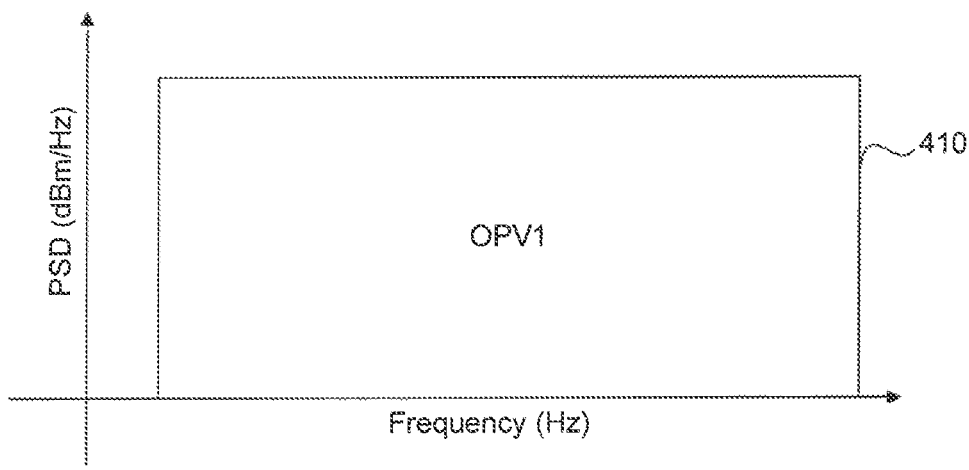

FIGS. 4B and 4C illustrate graphical representations of an exemplary legacy line spectrum 400 during data transmission and crosstalk measurement, respectively. As shown in FIG. 4B, during data transmission, the data signal 420 is transmitted after having been reduced by the reduction module 227 to occupy only a small portion of the available PSD and spectrum of the legacy line in order to reduce noise incident on neighboring lines for crosstalk measurement. As shown in FIG. 4C, during crosstalk measurement, the data signal is dropped and the OPV1 signal 410 is transmitted and occupies a much larger area of the available spectrum. This allows the receiver 150 to make an accurate measurement of the crosstalk effects of the legacy line.

Once the legacy crosstalk module 225 has generated the test signal for the legacy line, the crosstalk module 220 halts data transmission on neighboring lines. The crosstalk module 220 then causes the transmitter module 230 to load sync signals onto the neighboring lines, while simultaneously loading the test signal on to the legacy line.

The crosstalk module 220 can load the crosstalk signals onto the lines for one burst, or over multiple bursts. The determination as to whether the send the crosstalk signals one time versus multiple times can be made based on when a crosstalk information signal is received from the receiver 150. For example, the crosstalk module 220 can continue to transmit the crosstalk signals until the crosstalk information signal is received.

In the event that multiple bursts are needed, the bursts are preferably sent at periodic intervals, spaced apart from one another by one or more data bursts in accordance with the G.vector standard. FIG. 3 illustrates an exemplary crosstalk measurement timing chart that may be employed by the DS transmitter 200.

Figures 3A, 3B, 3C:
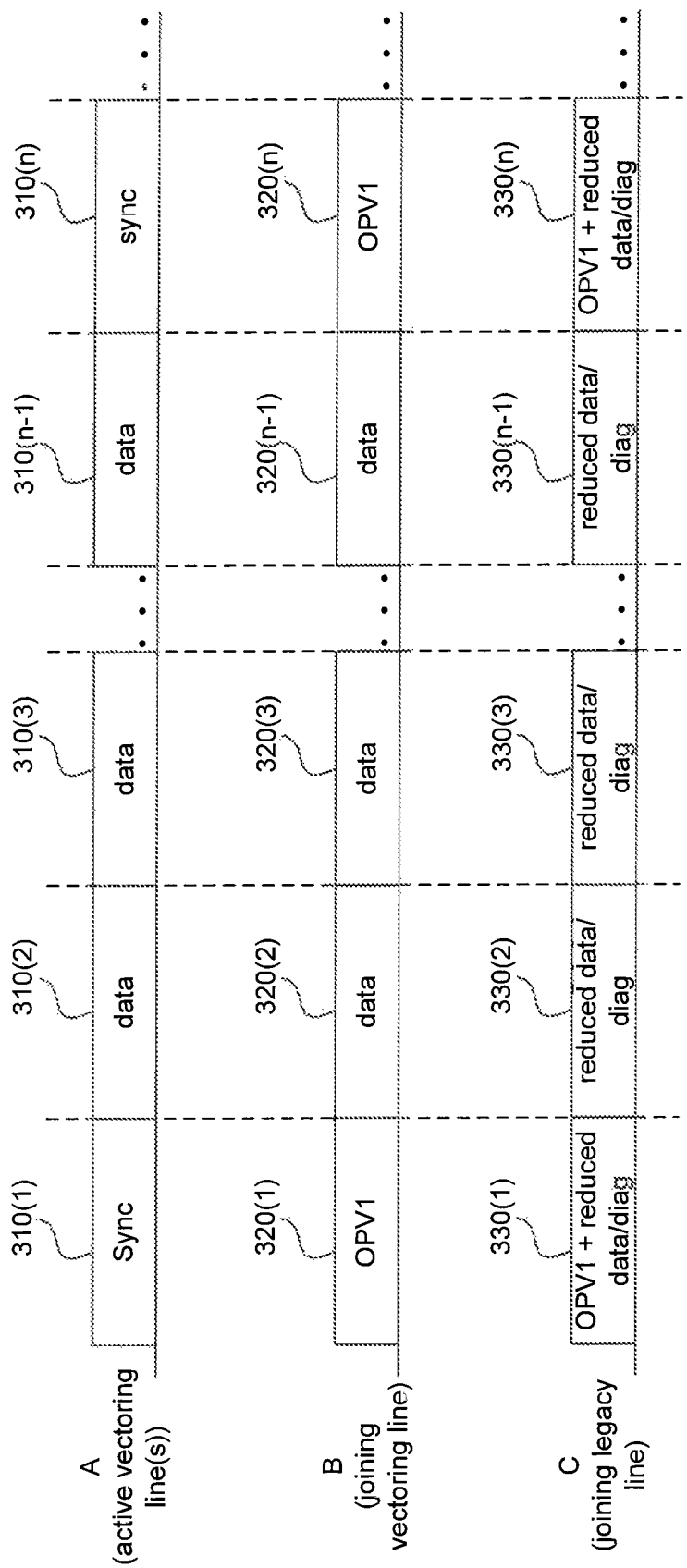
FIGS. 3A-3C illustrate an exemplary crosstalk measurement timing chart that may be employed by the DSL transmitter.

FIG. 3A illustrates a timing chart for active G.vector lines, FIG. 3B illustrates a timing chart for the scenario of adding a G.vector line, and FIG. 3C illustrates a timing chart for the scenario of adding a legacy line. The active G.vector line transmits information in several consecutive bursts 310, simultaneously with bursts 320/330 of an added G.vector or legacy line.

For the scenario of adding a G.vector line, it can be seen from FIGS. 3A and 3B that for a time period $T_1$, a sync burst 310(1) is transmitted on the active neighboring lines while an OPV1 burst 320(1) is transmitted on the added line. For a number of time periods $T_2$-$T_{n-1}$, data bursts 310(2)-310(n−1) are transmitted on the active neighboring lines while data bursts 320(2)-320(n−1) are transmitted on the added line, where n is any positive integer. It will be understood that a can be set based on application. After the consecutive data bursts, another sync burst 310(n) and another OPV1 burst 320(n) are transmitted on the active neighboring lines and the added line, respectively, during time period $T_n$.

In a scenario of adding a legacy line, signal transmissions for measuring crosstalk can be seen from FIGS. 3A and 3C. The active neighboring lines follow the same pattern described above, with a sync burst transmitted during time periods $T_1$ and $T_n$, and with a plurality of data bursts 310(2)-310(n−1) during periods $T_2$-$T_{n-1}$. Similarly, at times $T_1$ and $T_n$, the crosstalk module 220 causes the transmitter module 230 to transmit the test signals 330(1) and 330(n), respectively, on the added legacy line, where these test signals include the OPV1 signal superposed on the reduced data signal. During time periods $T_2$-$T_{n-1}$ therebetween, the crosstalk module 220 causes the transmitter module 230 to transmit the reduced data signals 330(2)-330(n−1) reduced by the reduction module 227. The signal transmission on the lines repeats in this manner until the crosstalk detection has concluded, which may occur upon receipt of the crosstalk information signal from the receiver 150. In an embodiment, at times $T_1$ and $T_n$, data bits can instead be dropped and the crosstalk test signal transmitted alone. In this configuration correction will be needed at the receiver.

Measure During Diagnostic Mode

In an embodiment, the transmitter 200 measures the crosstalk of the legacy line during a diagnostic mode of the legacy line. In this configuration, the controller module 210 initiates the handshake phase, during which it signals that the diagnostic mode be entered.

Once the added legacy line enters the diagnostic mode, the crosstalk measurement functions substantially similarly to the configuration described above with respect to the showtime mode. The crosstalk module 220 controls the transmissions over the various lines in order to measure the crosstalk resulting from the new legacy line.

As shown in FIG. 3C, while the added legacy line is in the diagnostic mode, the crosstalk module 220 will periodically (e.g., $T_1$ and $T_n$) cause a test signal (330(1) and 330(n)) to be transmitted on the added legacy line for purposes of measuring crosstalk. The legacy crosstalk module 225 in this instance generates the test signal to have the OPV1 signal 410 superposed on a reduced diagnostic signal 420 (reduced in the manner described above), as shown in FIG. 4A. The crosstalk module 220 causes the test signal to be transmitted on the added legacy line at the same times as sync signals are transmitted on the neighboring lines for measuring the crosstalk. In an alternative embodiment, the legacy crosstalk module 225 can discard the data bits and generate the test signal to be only the OPV1 signal 410, as shown in FIG. 4C. In this configuration, because the diagnostic signals do not include any data bits, no correction will be needed at the receiver.

During time periods $T_2$-$T_{n-1}$ between the test intervals $T_1$ and $T_n$, the crosstalk module 220 causes the transmitter module 230 to transmit reduced diagnostic signals (e.g., having a spectrum similar to the reduced data signal discussed above) on the added legacy line while allowing data signals to be transmitted on the neighboring lines. By periodically repeating the transmission of test signals on the legacy line, the receiver 150 is able to accurately measure the crosstalk caused by the added legacy line. Once the crosstalk information signal has been received from the receiver 150, the controller module 210 ends diagnostic mode (provided that no actual diagnostics are needed) and proceeds through the following phases to showtime phase.

Figure 5:
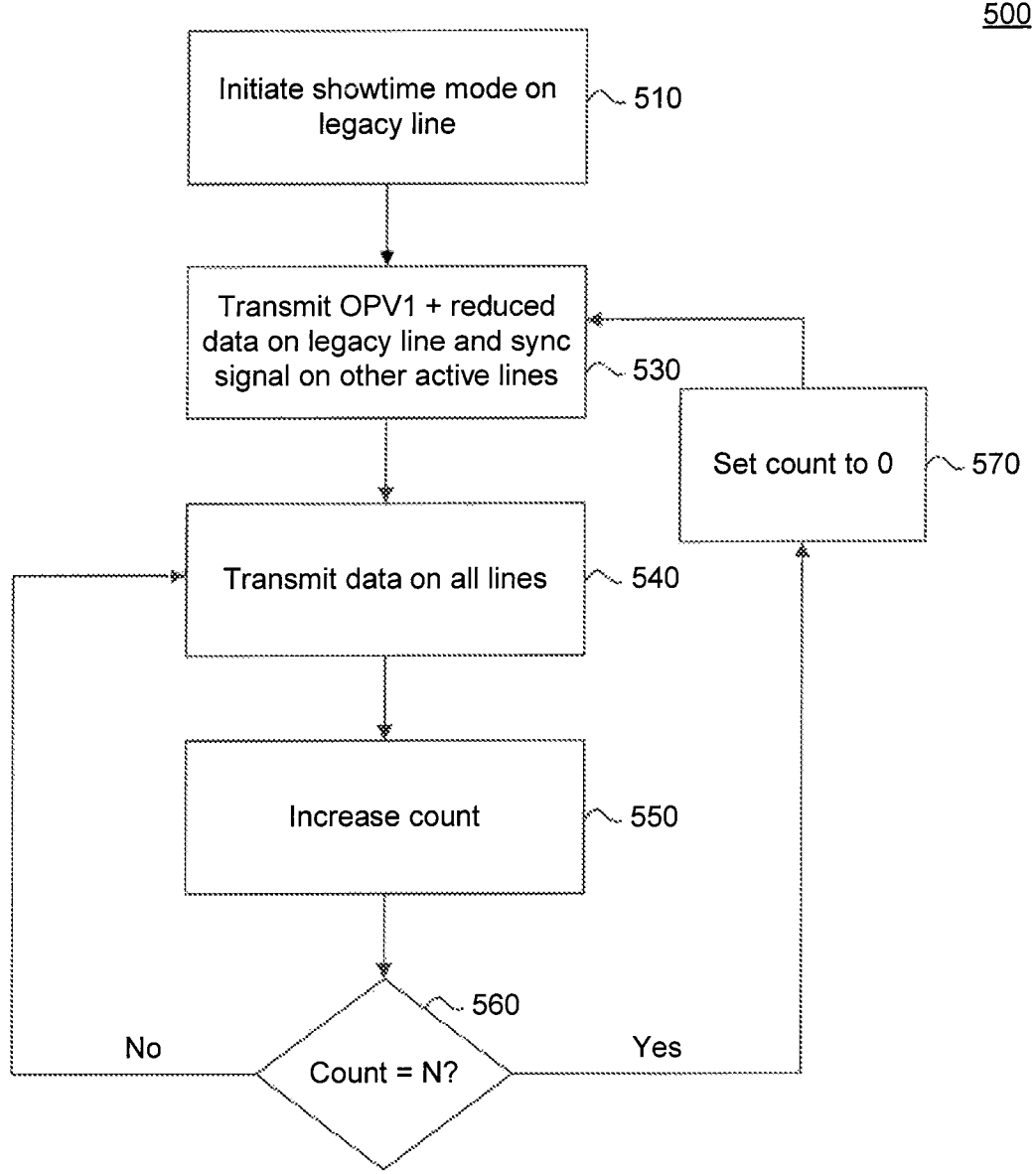
FIG. 5 illustrates a flowchart diagram of an exemplary method for measuring crosstalk from a legacy line.

Exemplary Method of Measuring Crosstalk Resulting from an Added Legacy Line During Showtime Mode FIG. 5 illustrates a flowchart diagram of an exemplary method for measuring crosstalk from a legacy line in a DSL system during a showtime mode of the legacy line.

Upon the legacy line being added to the DSL system, a showtime mode of the legacy line is initiated (510). Once in showtime mode, a data signal designated for the legacy line is reduced in at least one of PSD and spectrum and superposed with an OPV1 signal, which is then transmitted over the legacy line simultaneously while sync signals are transmitted over neighboring (non-legacy) lines (530) during a particular time interval.

At a subsequent time interval, data signals are transmitted over all lines (540), including a reduced data signal on the legacy line that has been reduced in PSD and frequency spectrum. Data signals continue to be sent on the lines for N consecutive time periods. Specifically, after the data is sent for a time period (540), a count (initially set at 0) is increased by 1 (550). A check is then made to determine if the count equals N (560). If the count does not equal N (560—No), then data is again transmitted on the lines (540) and the cycle repeats. Once the count equals N (560-Yes), the count is reset to zero (570) and a data signal for the next time interval is reduced (520) and transmitted with an OPV1 signal (530) again. This loop repeats until the crosstalk from the added legacy line has been measured. In relation to FIGS. 3A-3C, N=n−2.

Those skilled in the relevant art(s) will recognize that the above method can additionally or alternatively include any of the functionality of the transmitter 110/200 discussed above, as well as any of its modifications. Further, the above description of the exemplary method should neither be construed to limit the method nor the description of the transmitter 110/200.

Figure 6:
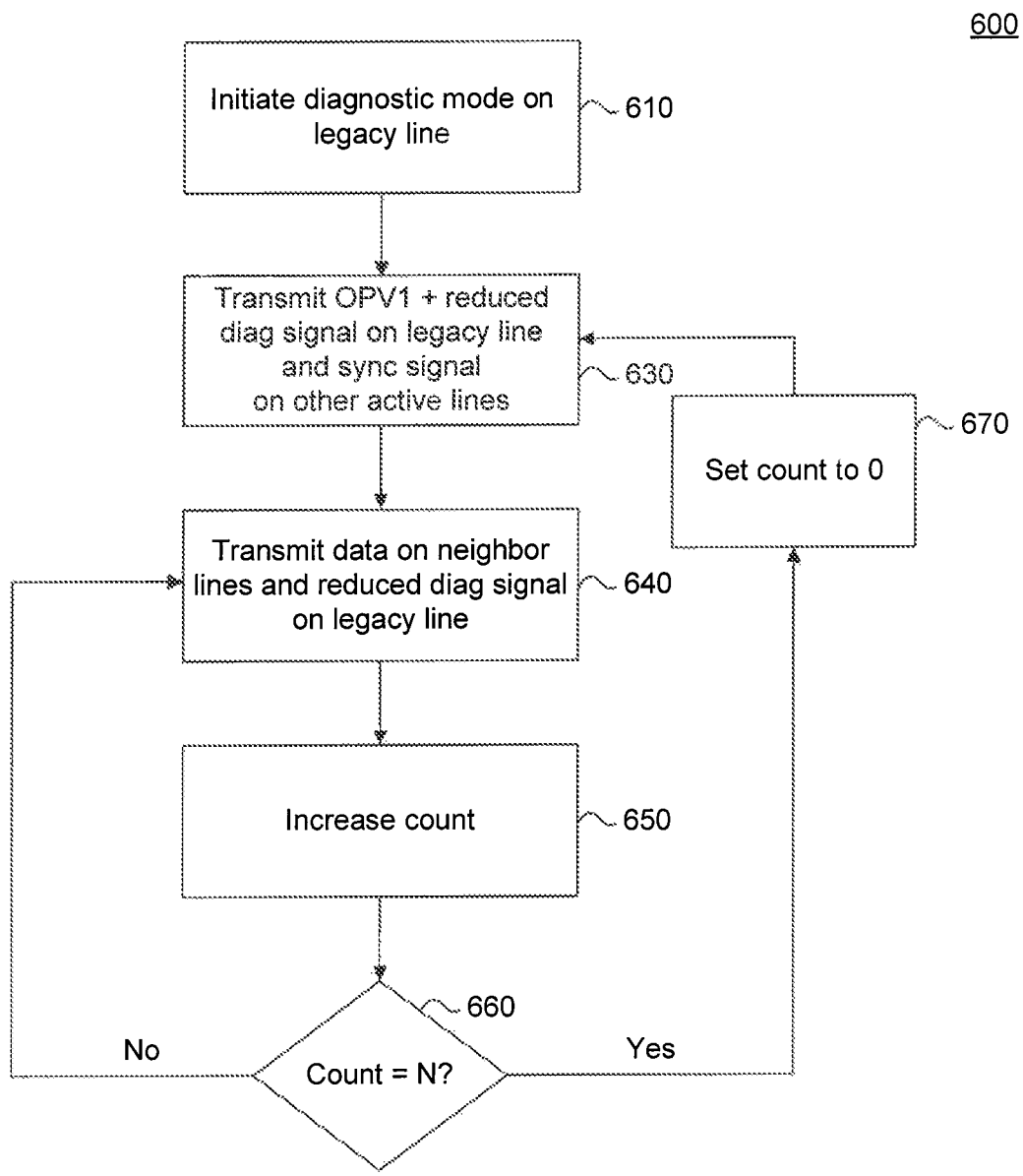
FIG. 6 illustrates a flowchart diagram of an exemplary method for measuring crosstalk from a legacy line.

Exemplary Method of Measuring Crosstalk Resulting From an Added Legacy Line During Diagnostic Mode FIG. 6 illustrates a flowchart diagram of an exemplary method for measuring crosstalk from a legacy line in a DST, system during a diagnostic mode of the legacy line.

Upon the legacy line being added to the DSL system, a diagnostic mode of the legacy line is initiated (610). Once in diagnostic mode, a diagnostic signal designated for the legacy line is reduced in at least one of PSD and spectrum and superposed with an OPV1 signal, which is then transmitted over the legacy line simultaneously while sync signals are transmitted over neighboring lines (630) during a particular time interval.

At a subsequent time interval, data signals are transmitted over all neighboring lines while a reduced diagnostic signal is transmitted over the legacy line (640) that has been reduced in PSD and frequency spectrum. This continues for N consecutive time periods. For example, after the data/diagnostic signals are sent for a time period (640), a count (initially set at 0) is increased by 1 (650). A check is then made to determine if the count equals N (660). If the count does not equal N (660-NO), then data is again transmitted on the neighboring lines while the unreduced diagnostic signal is transmitted on the legacy line (640) and the cycle repeats. Once the count equals N (660-Yes), the count is reset to zero (670) and a diagnostic signal for the next time interval is reduced (620) and transmitted with an OPV1 signal (630) again. This loop repeats until the crosstalk from the added legacy line has been measured. In relation to FIGS. 3A-3C, N=n−2.

Those skilled in the relevant art(s) will recognize that the above method can additionally or alternatively include any of the functionality of the transmitter 110/200 discussed above, as well as any of its modifications. Further, the above description of the exemplary method should neither be construed to limit the method nor the description of the transmitter 110/200.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
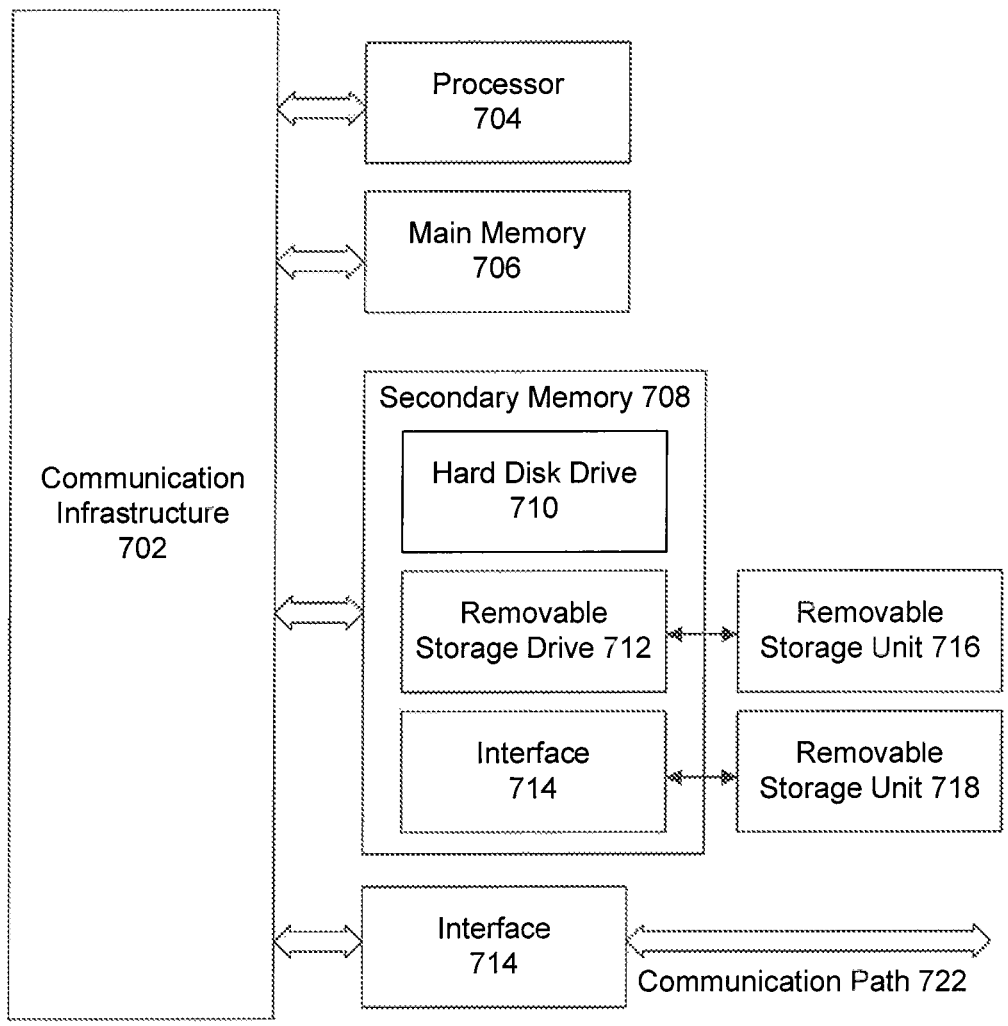
FIG. 7 illustrates a block diagram of an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. One or more of the modules depicted in the previous figures can be implemented by one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk dive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Further, the disclosure should not be limited by any of the above-described exemplary embodiments, but should be defined only in accordance with the following claims and their equivalents.

What is claimed is:

1. A Digital Subscriber Line (DSL) transmitter for measuring crosstalk among lines of a DSL cable, the DSL transmitter comprising:
    a controller module configured to generate data signals for transmission on the DSL cable, the DSL cable including a first DSL line and a legacy DSL line; and
    a crosstalk module configured to pass the data signals to the DSL cable during a data mode, and to pass crosstalk signals to the DSL cable during a first test mode or a second test mode,
    wherein, during the first test mode, the crosstalk signals include a first test signal designated for transmission on the first DSL line and the sync symbol designated for transmission on a plurality of additional DSL lines,
    wherein, during the second test mode, the crosstalk signals include a legacy test signal designated for transmission on the legacy DSL line and the sync symbol designated for transmission on the plurality of additional DSL lines,
    wherein the legacy test signal is different from the first test signal and is constructed using the first test signal,
    wherein the first test signal is an O-P-Vector-1 signal,
    wherein the crosstalk module includes a legacy crosstalk module configured to reduce at least one of a frequency spectrum or a power spectrum density of a corresponding one of the data signals designated for the legacy DSL line, and
    wherein the legacy crosstalk module is further configured to superpose the O-P-Vector-1 signal on the reduced one of the data signals to generate the legacy test signal.

2. The DSL transmitter of claim 1, wherein the first DSL line is compatible with the G.993.5 DSL communication standard, and
    wherein the legacy DSL line is incompatible with the G.993.5 DSL communication standard.

3. The DSL transmitter of claim 1, wherein, during the second test mode, the sync symbol is designated for transmission on the first DSL line.

4. The DSL transmitter of claim 1, wherein the power spectrum density of the reduced one of the data signals is at least 20 dB below a nominal power spectrum density and the frequency spectrum of the reduced one of the data signals is no more than 2.2 MHz.

5. The DSL transmitter of claim 1, wherein the reduced one of the data signals is a legacy diagnostic signal.

6. A Digital Subscriber Line (DSL) transmitter for measuring crosstalk among a plurality of first DSL lines and a second DSL line, the DSL transmitter comprising:
    a controller module configured to generate a first data stream to be transmitted on at least one of the plurality of first DSL lines or a second data stream to be transmitted on the second DSL line; and
    a crosstalk module configured to generate a crosstalk test signal from a portion of the second data stream corresponding to a time interval and, for the time interval, interrupt the first data stream to transmit a sync signal onto the plurality of first DSL lines and the crosstalk test signal on the second DSL line, wherein the crosstalk test signal includes an O-P-Vector-1 signal, wherein the crosstalk test signal includes the portion of the second data stream confined to predefined portions of an available power spectrum density and frequency spectrum, and wherein the crosstalk test signal includes the O-P-Vector-1 signal superposed with the portion of the second data stream.

7. The DSL transmitter of claim 6, wherein the crosstalk module is configured to periodically repeat the interrupt and the generation during later time intervals until a stop condition is met.

8. The DSL transmitter of claim 7, wherein the later time intervals are regular and are separated from each other by transmission periods during which the first data stream is transmitted on the at least one of the plurality of first DSL lines or the second data stream is transmitted on the second DSL line.

9. The DSL transmitter of claim 8, wherein the stop condition includes receipt by the DSL transmitter of a crosstalk information signal from an external device.

10. The DSL transmitter of claim 6, wherein the second data stream is a diagnostic stream.

11. A method of measuring crosstalk injected into a first Digital Subscriber Line (DSL) line by a second DSL line, the method comprising:

interrupting a first data stream designated for the first DSL line for a time interval;

injecting a first crosstalk signal onto the first DSL line during the time interval;

converting a portion of a second data stream designated for the second DSL line that corresponds to the time interval into a second crosstalk signal that is different from the first crosstalk signal and that includes a representation of the portion of the second data stream and an O-P-Vector-1 signal;

transmitting the second crosstalk signal on the second DSL line during the time interval, and injecting a sync signal onto a plurality of additional DSL lines during the time interval, wherein the converting includes reducing at least one of a frequency spectrum or a power spectrum density of the portion of the second data stream, wherein the converting further includes superposing the O-P-Vector-1 signal on the reduced portion of the second data stream.

12. The method of claim 11, wherein the first crosstalk signal is the sync signal.

13. The method of claim 11, further comprising repeating the interrupting, injecting, converting and transmitting at periodic future time intervals until a stop condition is satisfied.

14. The method of claim 13, wherein the stop condition includes receiving a crosstalk information signal from an external device.

* * * * *